United States Patent
Yang et al.

(10) Patent No.: US 10,697,663 B1
(45) Date of Patent: Jun. 30, 2020

(54) MOTOR CONTROLLER FOR ELECTRIC BLOWERS

(71) Applicant: REGAL BELOIT AMERICA, INC., Beloit, WI (US)

(72) Inventors: Bin Yang, Fort Wayne, IN (US); Brian Lee Beifus, Fort Wayne, IN (US); Roger Carlos Becerra, Fort Wayne, IN (US)

(73) Assignee: REGAL BELOIT AMERICA, INC., Beloit, WI (US)

(*) Notice: Subject to any disclaimer, the term of this patent is extended or adjusted under 35 U.S.C. 154(b) by 0 days.

(21) Appl. No.: 16/242,738

(22) Filed: Jan. 8, 2019

(51) Int. Cl.
| | |
|---|---|
| *F24F 11/75* | (2018.01) |
| *F04D 13/06* | (2006.01) |
| *F04D 25/08* | (2006.01) |
| *F04D 27/00* | (2006.01) |
| *H02P 6/08* | (2016.01) |
| *F04D 29/053* | (2006.01) |
| *F04D 15/00* | (2006.01) |

(52) U.S. Cl.
CPC .......... *F24F 11/75* (2018.01); *F04D 13/0686* (2013.01); *F04D 15/0066* (2013.01); *F04D 25/08* (2013.01); *F04D 27/007* (2013.01); *F04D 29/053* (2013.01); *H02P 6/08* (2013.01); *F04D 27/004* (2013.01)

(58) Field of Classification Search
CPC ....... F04D 15/0066; F24F 11/75; F24F 11/72; F24F 11/74; F24F 11/85; F24F 2110/40; F24F 2140/10
USPC .......................... 700/276, 282; 417/44.2, 44.3
See application file for complete search history.

(56) References Cited

U.S. PATENT DOCUMENTS

| | | | | |
|---|---|---|---|---|
| 4,927,328 | A * | 5/1990 | Scoates ................. | F04D 29/547 123/41.49 |
| 6,994,620 | B2 * | 2/2006 | Mills ....................... | F24F 11/30 454/255 |
| 7,567,049 | B2 | 7/2009 | Shahi et al. | |
| 8,408,878 | B2 | 4/2013 | Shahi et al. | |
| 9,200,995 | B2 * | 12/2015 | Ahola .................. | G01N 15/082 |
| 9,631,830 | B2 * | 4/2017 | Sasaki .................. | G05D 7/0629 |
| 9,732,976 | B2 * | 8/2017 | Wang ....................... | F24F 11/30 |
| 2005/0159845 | A1 * | 7/2005 | Malone .................... | G06F 1/20 700/276 |
| 2005/0247194 | A1 * | 11/2005 | Kang .................. | B01D 46/0086 95/19 |
| 2009/0247064 | A1 * | 10/2009 | Chen ....................... | F24F 11/77 454/239 |
| 2012/0212166 | A1 * | 8/2012 | Merkel ................... | G06F 30/17 318/400.08 |
| 2015/0064023 | A1 | 3/2015 | Sasaki et al. | |

* cited by examiner

*Primary Examiner* — Philip E Stimpert
(74) *Attorney, Agent, or Firm* — Armstrong Teasdale LLP (57) ABSTRACT

A motor controller for an electric motor for driving a blower to generate an airflow. The motor controller includes a processor and a drive circuit configured to regulate power supplied to the motor to turn the blower. The processor computes a system resistance for the blower based on a fixed set point for a first control parameter and a feedback parameter. The processor receives an airflow rate demand value and computes an operating set point for a second control parameter based on the system resistance and the airflow rate demand value. The processor controls the drive circuit based on the operating set point to supply electrical power to the electric motor and to operate the blower to generate the airflow.

21 Claims, 5 Drawing Sheets

MOTOR CONTROLLER FOR ELECTRIC BLOWERS

BACKGROUND

The field of the disclosure relates generally to a motor controller for electric blower motors and, more specifically, a motor controller that enables approximately constant airflow production from a backward-curved, forward-curved, or radial electric blower.

At least some electric motors are torque-calibrated when manufactured to ensure the torque output at the drive shaft of the electric motor matches the torque commanded. At least some electric motors, particularly electric motors driving blowers, such as a forward-curved blower, are further calibrated to produce approximately a constant airflow during operation in either a torque-control mode or a speed-control mode. Such a calibration, or characterization, quantizes airflow output for a given speed and torque output when driving the blower. The actual airflow output can vary according to the blower construction or duct, space, or other airflow restriction, into which the airflow is directed.

Constant airflow heating, ventilation, and air conditioning (HVAC) systems improve thermal comfort and energy savings. Constant airflow systems may also be used in certain refrigeration systems. In a constant airflow system, a motor controller for an electric blower motor receives an airflow rate demand, e.g., a value in cubic feet per minute (CFM), and then determines, e.g., by a polynomial or constant airflow algorithm, an appropriate motor torque or motor speed to produce approximately the airflow demanded. In a torque-controlled implementation, for example, motor torque is regulated based on a monitored motor speed to produce the approximate airflow.

It is desirable to utilize a backward-curved, or backward-inclined, electric blower in constant airflow HVAC systems to improve efficiency of the electric blower. Backward-curved blowers generally produce a given airflow at a higher speed and with reduced power relative to radial or forward-curved counterparts. However, such backward-curved blowers may produce multiple different airflows when operated at a given torque and speed, particularly at high airflow values. Consequently, a motor controller using known constant airflow algorithms cannot effectively operate a backward-curved electric blower to produce a demanded airflow by operating in a traditional torque-control or speed-control mode. A motor controller that overcomes this limitation for a backward-curved electric blower is desired.

BRIEF DESCRIPTION

In one aspect, a motor controller for an electric motor configured to drive a blower to generate an airflow is provided. The motor controller includes a drive circuit and a processor. The drive circuit is configured to regulate electrical power supplied to a stator of the electric motor to turn a rotor of the electric motor and generate the airflow. The processor is coupled to the drive circuit and is configured to compute a system resistance for the blower based on a fixed set point for a first control parameter and a feedback parameter. The processor is configured to receive an airflow rate demand value and compute an operating set point for a second control parameter based on the system resistance and the airflow rate demand value. The processor is configured to control the drive circuit based on the operating set point to supply electrical power to the electric motor and to operate the blower to generate the airflow.

In another aspect, a method of operating an electric motor configured to drive a blower to generate an airflow. The method includes controlling a drive circuit based on a fixed set point for a first control parameter to supply electrical power to the electric motor and to operate the blower. The method includes determining a feedback parameter corresponding to the fixed set point. The method includes determining an airflow value corresponding to the first control parameter and the feedback parameter. The method includes computing a system resistance for the blower based on the first control parameter and the feedback parameter. The method includes receiving an airflow rate demand value. The method includes computing an operating set point for a second control parameter based on the system resistance and the airflow rate demand value. The method includes controlling the drive circuit based on the operating set point to supply electrical power to the electric motor and to operate the blower to generate the airflow.

In yet another aspect, a constant airflow system is provided. The constant airflow system includes a blower, an electric motor, and a motor controller. The electric motor is coupled to and configured to drive the blower to generate an airflow. The electric motor includes a stator and a rotor coupled to the blower. The motor controller includes a drive circuit configured to regulate electrical power supplied to the stator to turn the rotor and the blower to generate the airflow. The motor controller includes a processor configured to compute a system resistance for the duct. The processor is configured to receive an airflow rate demand value. The processor is configured to compute an operating set point for a control parameter based on the system resistance and the airflow rate demand value. The processor is configured to control the drive circuit based on the operating set point to supply electrical power to the electric motor and to operate the blower to generate the airflow.

DETAILED DESCRIPTION

Embodiments of the motor controller and methods of operating an electric blower motor for a constant airflow system described herein provide improved characterization of the electric blower motor based on motor torque, motor speed, airflow, and system resistance. The improved characterization enables constant airflow production using a backward-curved electric blower while maintaining the benefits of the backward-curved blower over a radial or forward-curved blower, namely the improved efficiency and greater pressure generation. Alternatively, the improved characterization also enables constant airflow production using a forward-curved electric blower or a radial electric blower.

Embodiments of the motor controller and methods described herein characterize the electric blower utilizing, for example, correlations among torque (T), speed (N), demanded airflow (Q), and system resistance (R). More specifically, the blower may be characterized by an airflow algorithm, or "torque correlation," that defines, for example, torque (T) as a function of speed (N) and demanded airflow (Q). In alternative embodiments, the blower is characterized by a "speed correlation" that defines speed (N) as a function of torque (T) and demanded airflow (Q). The constant airflow system is further characterized by its system resistance (R) defined as a function of demanded airflow (Q), speed (N), and a static pressure (P) generated by the blower. In alternative embodiments, system resistance (R) may be defined as a function of any two or more of demanded airflow (Q), torque (T), speed (N), or static pressure (P). Likewise, in certain embodiments, because static pressure may be defined in terms of demanded airflow (Q) and one or both of torque (T) and speed (N), or defined as a function of torque (T) and speed (N), system resistance may be defined simply as a function of demanded airflow (Q) and one or both of torque (T) and speed (N). Using these correlations, together referred to as the "constant airflow algorithm," a backward-curved, forward-curved, or radial electric blower motor can be operated in a torque control mode, a speed control mode, or both to produce an approximately constant airflow from the blower.

In alternative embodiments, the electric motor may be characterized utilizing correlations among torque (T) or speed (N) and one or more of power input to the electric motor, current supplied to the electric motor, power output at the drive shaft of the motor, motor efficiency, or power output from the blower itself, i.e, air power. For example, power output at the drive shaft is correlated to torque (T) and speed (N), i.e., $P_{shaft}=TN$, as well as to power input to the electric motor and motor efficiency, i.e., $P_{in}=P_{shaft}$/motor efficiency. Moreover, power input to the electric motor is a function of voltage and current supplied to the stator windings of the electric motor, i.e., $P_{in}=VI$.

In certain embodiments, the blower is first characterized to determine a set of constants for an airflow algorithm. In one embodiment, the blower, e.g., a backward-curved blower, is operated at a constant torque, e.g., 20%, and speed is measured to produce a torque-speed pair from which a torque-speed-airflow data point can be computed using an airflow algorithm, or "torque correlation," e.g., T=f(Q,N), similar in form to a traditional constant airflow algorithm for a forward-curved blower, for example. For example, the airflow algorithm may take the following form:

$$T=k_1NQ+k_2Q^2+k_3N+k_4N^2+k_5, \quad \text{EQ. 1}$$

where, $k_1$, $k_2$, $k_3$, $k_4$, $k_5$ are constants. Generally, the constants are predetermined for the backward-curved blower prior to installation.

In a torque-controlled implementation, for example, the characterization embodied in the motor controller and methods described herein produces one or more torque-speed-airflow data points that characterize the operating profile of the constant airflow system. That operating profile is then approximated by a polynomial, airflow algorithm, or formula that defines motor torque (T) as a function of motor speed (N) and airflow rate demand (Q). Likewise, in a speed-controlled implementation, for example, the characterization embodied in the motor controller and methods described herein again operates the backward-curved blower at a fixed speed, e.g., 20%, which produces one or more torque-speed-airflow data points that characterize the operating profile of the constant airflow system. That operating profile is then approximated by a polynomial, airflow algorithm, or formula, that defines motor speed (N) as a function of motor torque (T) and airflow rate demand (Q). In an alternative speed-controlled embodiment, the formula for motor torque (T) described above may be used to compare a computed torque to a torque value in a speed-torque pair for the desired motor speed (N). A torque error value resulting from the comparison may then be used to drive the motor speed (N) to a target, or objective, value. In another alternative embodiment, motor power may be defined as a function of motor speed (N), motor torque (T), and airflow rate demand (Q). In either embodiment, the characterization described herein yields values for various coefficients that scale the various algebraic terms of the polynomial. The polynomial is sometimes referred to as a constant airflow algorithm. However, it is generally understood the actual airflow produced by such a constant airflow system using a constant airflow algorithm only approximates the demanded airflow due to numerous sources of error and variabilities in environmental and physical properties of the constant airflow system and the duct or space into which the airflow is directed.

Generally, an airflow algorithm having more terms produces a finer fit to the data collected during characterization and, therefore, yields more accurate estimates of actual airflow. The fit of a given airflow algorithm may be further improved by enabling non-integer (e.g., real number) values for one or more coefficients or exponents. Consequently, electric motors and motor controllers must have sufficient processors, memory, communication interfaces, and software to program, store, recall, and execute such airflow algorithms. Moreover, a greater number of terms and non-integer coefficients in the airflow algorithm generally correlates to heavier computation loads in deriving the necessary coefficients. Generally, another consequence of utilizing more terms to produce a finer fit to the data collected during characterization, is that any gaps in the data, e.g., under-sampling, or outlier data points are captured in the resulting surface, giving the resulting surface undesirable contours, or possibly poles, that, accordingly, produce inaccurate airflow during operation, particularly at extrema of the operating profile of the electric motor and blower. Conversely, with fewer terms and a coarser fit to the data, the regression analysis tends to "filter," or "smooth," gaps in the data and outlier data points, thereby producing a surface having gentler contours and more accurate airflow production at extrema of the operating profile.

However, the airflow algorithm, or torque correlation, alone is generally insufficient to operate the backward-curved electric blower to produce a constant airflow over the full operating profile, because, as explained above, multiple airflow values correspond to a given torque-speed pair in certain regions of the operating profile, e.g., for high-volume airflows. To overcome this limitation of the airflow algorithm, the constant airflow system is further characterized by its system resistance (R). Using the torque-speed-airflow data point, the system resistance (R) is computed as a function of demanded airflow (Q) and static pressure (P) generated by the blower. In alternative embodiments, system resistance (R) is computed as a function of torque (T) and speed (N). Generally, at a given steady operating point for the backward-curved blower, producing a given demanded airflow (Q), the static pressure (P) it generates is related to the system resistance into which the airflow is produced by the equation:

$$P = RQ^2. \qquad \text{EQ. 2}$$

Accordingly, given a static pressure (P) generated by the backward-curved blower and the corresponding demanded airflow (Q), the system resistance (R) can be computed.

In certain embodiments, the static pressure (P) may be expressed as a function of speed (N) and airflow (Q). The function is referred to as a static pressure correlation and is approximated by a polynomial or formula defined in terms of speed (N), demanded airflow (Q), and one or more constants. For example, the static pressure correlation may take the following form:

$$P = a_1 c_1^2 N^2 - a_2 \frac{c_2^2}{c_1^2} \frac{Q}{N} + (c_3 Q^2 + c_4 Q + c_5)\left(1 + a_3 \frac{c_2}{c_1^2} \frac{Q}{N}\right), \qquad \text{EQ. 3}$$

where, $a_1$, $a_2$, $a_3$ are coefficients, and $c_1$, $c_2$, $c_3$, $c_4$, $c_5$ are constants. In one embodiment, the coefficients are defined as $a_1 = 4.3865 \times 10^3$, $a_2 = 0.010132$, $a_3 = 1.5198178$. Generally, the coefficients and constants are predetermined for the backward-curved blower prior to installation. In alternative embodiments, static pressure (P) may be expressed as a function of torque (T) and airflow (Q).

Accordingly, given the torque-speed-airflow data point described above, a static pressure (P) is computed, which enables computation, or characterization, of the system resistance (R). When a new airflow (Q) is demanded, EQ. 2 enables computation of a necessary static pressure (P) to be generated by the blower to produce the new airflow (Q) for the given system resistance (R). Given the value of the necessary static pressure (P) and the new airflow (Q), the static pressure correlation (EQ. 3) enables computation of a necessary speed (N) to produce that static pressure (P) and new airflow (Q). The combination of EQS. 1-3 described above are referred to as the constant airflow algorithm for the backward-curved blower. The motor controller then operates the electric motor, in a speed-controlled mode, at that speed (N) to produce an approximately constant airflow. Alternatively, the motor controller may use the speed (N) and airflow (Q) to compute a torque (T) for operating the electric motor in a torque-controlled mode. In alternative embodiments, the constant airflow algorithm can be formed from a combination of two or more correlations (i.e., formula, equations, or polynomials) among speed (N), torque (T), airflow (Q), system resistance (R), or static pressure (P). For example, the constant airflow algorithm may be formed from a combination of torque (T) expressed as a function of speed (N) and airflow (Q), and system resistance (R) expressed as a function of speed (N) and airflow (Q). In another example, the constant airflow algorithm may be formed from a combination of system resistance (R) expressed as a function of speed (N) and torque (T), and system resistance (R) expressed as a function of airflow (Q) and torque (T).

In many constant airflow systems, the system resistance is generally considered constant over a period of time. In practice, that system resistance may shift over time, for example, due to dirt, dust, or other contamination buildup on the air filter or other changing components of the system or space into which the airflow is directed. In other systems, the system resistance is controllable, for example, by configuring dampers, louvres, ducts, or vents to increase or decrease the resistance of the system to the airflow. In such systems, the motor controller detects a change in system resistance (R) and adjusts the operating point accordingly.

For example, when operating in a speed-controlled mode and the system resistance (R) increases, the motor controller detects a change in torque output of the electric motor. This new torque-speed pair results in a recalculation of the system resistance (R) using the torque correlation (EQ. 1) and static pressure correlation (EQ. 3). Given the increased system resistance (R) and the demanded airflow (Q), a new speed (N) is computed and the operating point of the electric motor is adjusted. This procedure iterates until the system converges on a stable operating point for the increased system resistance (R).

Figure 1:
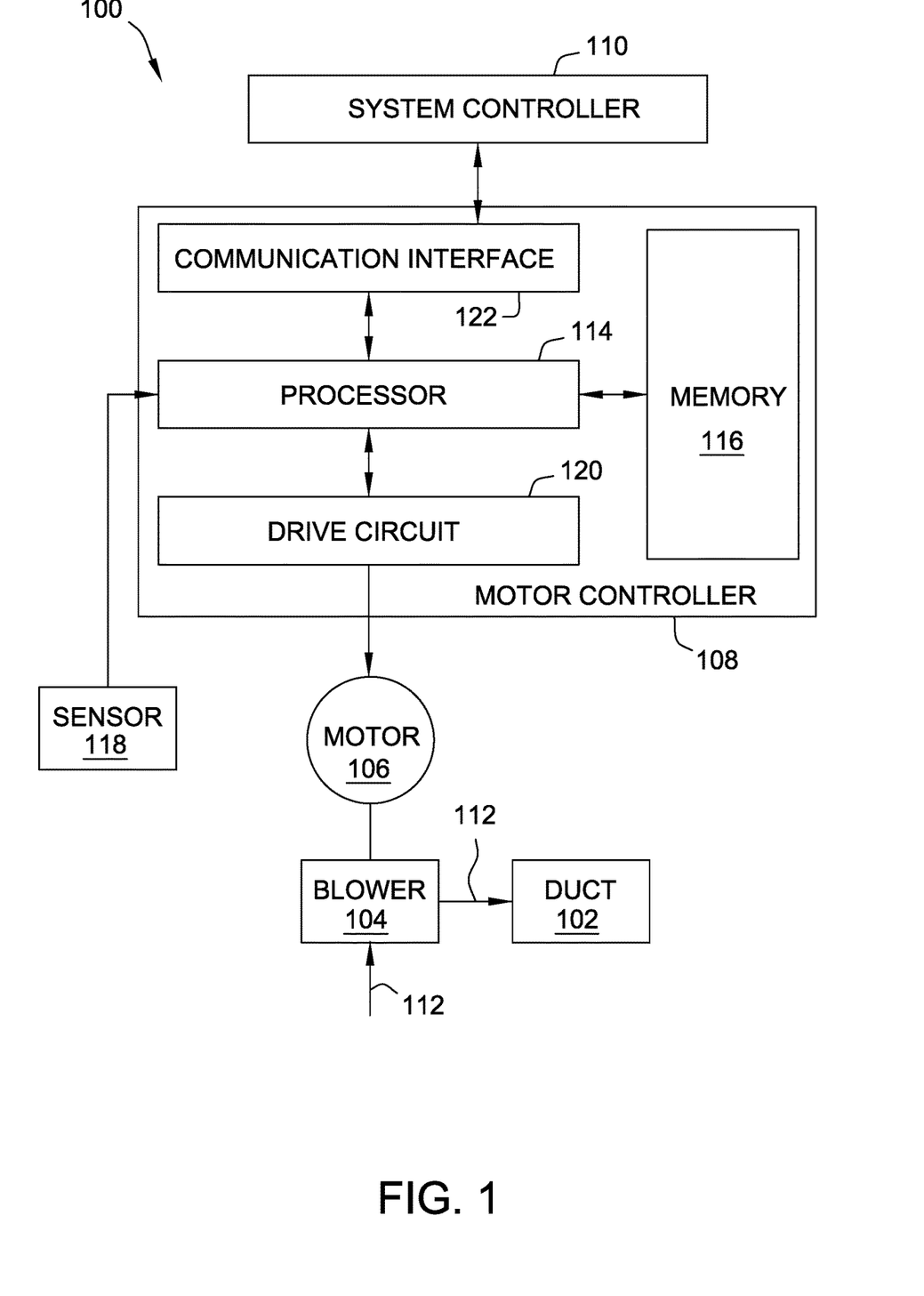
FIG. 1 is a block diagram of an exemplary constant airflow system.

FIG. 1 is a block diagram of a constant airflow system 100. Constant airflow system 100 includes a duct 102, a blower 104, an electric motor 106, a motor controller 108, and a system controller 110. In other embodiments, constant airflow system 100 may include additional, fewer, or alternative components, including those described elsewhere herein. For example, blower 104 may be configured to generate an airflow into a space other than a duct.

Blower 104 is configured to generate an airflow 112 directed through duct 102. Duct 102 is configured to guide the airflow for circulation and distribution within a building, vehicle, or other structure. Duct 102, or alternatively the space into which airflow 112 is directed, has an airflow restriction, or system resistance (R), that affects the airflow output from blower 104. The airflow restriction is based on various parameters that may affect airflow within constant airflow system 100, such as, but not limited to, the internal dimensions of duct 102, open or closed dampers, contaminants (e.g., dust) within duct 102, the geometry of duct 102, or alternatively the space into which airflow 112 is directed, and the like.

Electric motor 106 is configured to drive blower 104 to generate the airflow 112 into duct 102. In at least some embodiments, electric motor 106 is an induction motor configured to convert electrical power into mechanical power. In alternative embodiments, electric motor 106 is a permanent magnet motor. In one example, electric motor 106 is coupled to a wheel (not shown) of blower 104 and is configured to rotate the wheel. In the exemplary embodiment, electric motor 106 is configured to operate at a plurality of torque output levels (i.e., torque-controlled) to increase or decrease a corresponding motor speed. Increasing or decreasing the motor speed of electric motor 106 causes electric motor 106 to drive blower 104 to generate corresponding airflows. The airflow 112 generated by blower 104 is at least partially a function of the motor speed of electric motor 106 and the airflow restriction of duct 102. In some embodiments, electric motor 106 is integrated with blower 104.

Alternatively, electric motor 106 is configured to operate at a plurality of speed output levels (i.e., speed-controlled) to increase or decrease a corresponding motor torque. As in the torque-controlled embodiments, increasing or decreasing the torque of electric motor 106 causes electric motor 106 to drive blower 104 to generate corresponding airflows.

Motor controller 108 is communicatively coupled to electric motor 106 to operate electric motor 106. More specifically, motor controller 108 supplies electrical power of a certain current and frequency to the stator windings of electric motor 106 to operate electric motor 106. By adjusting the current and frequency, motor controller 108 controls the torque (or alternatively speed in a speed-controlled embodiment) of the electric motor 106, thereby facilitating control of the speed of electric motor 106. In other embodiments, motor controller 108 may be communicatively coupled to a second controller (not shown) associated with electric motor 106. In such embodiments, motor controller 108 may be configured to transmit control signals to the second controller to instruct the second controller to operate electric motor 106. In such an embodiment, motor controller 108 may be separated, or remote, from electric motor 106. For example, motor controller 108 may be located within an HVAC assembly along with blower 104 and electric motor 106. In another embodiment, for example, motor controller 108 may be located with a thermostat system or system controller 110.

Motor controller 108 includes a processor 114, a memory 116 communicatively coupled to processor 114, and a sensor system 118. Processor 114 is configured to execute instructions stored within memory 116 to cause motor controller 108 to function as described herein. For example, memory 116 is configured to store a constant airflow algorithm to be executed by processor 114. Memory 116 is further configured to store a plurality of coefficient values for use in the constant airflow algorithm. Moreover, memory 116 is configured to store data to facilitate calibrating electric motor 106. In some embodiments, motor controller 108 may include a plurality of processors 114 and/or memories 116. In other embodiments, memory 116 may be integrated with processor 114. In one example, memory 116 includes a plurality of data storage devices to store instructions and data as described herein.

Prior to operation of motor controller 108 described herein, motor controller 108 receives values for coefficients that result from a regression analysis of characterization data for electric motor 106 and blower 104. The coefficients correspond to programmable variables within the constant airflow algorithm stored in memory on motor controller 108 and executable by processor 114 during operation. In certain embodiments, certain other constants for the constant airflow algorithm, or alternative constant airflow algorithms, may be defined and stored, for example, in memory 116, such as an EEPROM. In certain embodiments, the values for coefficients may be received from external system controller 110 or other device over a wired or wireless communication channel. In another alternative embodiment, the values for coefficients may be programmed into motor controller 108 by a technician or installer when motor controller 108 is installed.

During operation, motor controller 108 generally receives an airflow rate demand (Q) from external system controller 110 and one of motor torque (T) and motor speed (N) measured at electric motor 106. The other of motor torque (T) and motor speed (N) is computed. For example, in a torque-controlled embodiment, system controller 110 transmits an airflow rate demand (Q) to motor controller 108, and motor controller 108 computes a motor torque (T) to be commanded of electric motor 106 based on a measured motor speed (N). In an alternative embodiment, system controller 110 transmits a discrete selection, or an index, of a particular airflow rate demand (Q) from among a plurality of values stored in a table in memory 116. Motor speed (N) may be determined from the current signal supplied to the stator windings or, alternatively, may be measured directly by sensor system 118. The torque control loop then recursively executes, or iterates, until motor torque (T) converges on an objective torque. The torque control loop may execute, for example, once every 100 milliseconds. In alternative embodiments, the torque control loop period may be lengthened or shortened depending on, for example, the specific electric motor, blower, or duct configuration.

Likewise, in a speed-controlled embodiment, system controller 110 transmits an airflow rate demand (Q) to motor controller 108, and motor controller 108 computes a motor speed (N) to be commanded of electric motor 106 based on a measured motor torque (T). As described above with respect to motor speed (N), motor torque (T) may be determined from the current signal supplied to the stator windings or, alternatively, may be measured directly by sensor system 118. The speed control loop then iterates until motor speed (N) converges on an objective speed.

Sensor system 118 includes one or more sensors that are configured to monitor electric motor 106. In certain embodiments, sensor system 118 is omitted and motor torque and speed are determined from the current signal supplied to the stator windings of electric motor 106. In one embodiment, sensor system 118 is configured to monitor a frequency output of motor controller 108 to electric motor 106. Sensor system 118 may monitor other data associated with electric motor 106, such as, but not limited to, motor speed, torque, power, and the like. In certain embodiments, sensor system 118 is configured to monitor an airflow output of blower 104. For example, sensor system 118 may include an air pressure sensor configured to monitor static pressure within duct 102. In some embodiments, sensor system 118 monitors electric motor 106 from motor controller 108. In such embodiments, sensor system 118 may be integrated with processor 114. In other embodiments, at least some sensors of sensor system 118 may be installed on electric motor 106 and transmit sensor data back to motor controller 108.

In one embodiment, motor controller 108 is configured to calibrate electric motor 106 for a plurality of airflow output levels to determine corresponding pairs of torque and speed. The resulting airflow-torque-speed data points define a surface that further defines the operating profile of constant airflow system 100.

Motor controller 108 includes a drive circuit 120. Drive circuit 120 supplies electric power to the stator windings of electric motor 106 based on control signals received from processor 114. Drive circuit 120 may include, for example, various power electronics for conditioning line frequency alternating current (AC) power to be supplied to the stator windings of electric motor 106 with a desired current, i.e., phase and amplitude, and frequency. Such power electronics may include, for example, and without limitation, one or more rectifier stages, power factor correction (PFC) circuits, filters, transient protection circuits, EMF protection circuits, inverters, or power semiconductors.

Motor controller 108 includes a communication interface 122. Communications interface 122 may include one or more wired or wireless hardware interface, such as, for example, universal serial bus (USB), RS232 or other serial bus, CAN bus, Ethernet, near field communication (NFC), WiFi, Bluetooth, or any other suitable digital or analog interface for establishing one or more communication channels between system controller 110 and motor controller 108. For example, in certain embodiments, one or more parameters, such as a maximum airflow rate (expressed in cubic feet per minute), airflow rate demand, or one or more coefficient values, may be communicated to motor controller 108 through communications interface 122 using a pulse-width modulated signal. Communications interface 122 further includes a software or firmware interface for receiving one or more motor control parameters and writing them, for example, to memory 116. In certain embodiments, communication interface 122 includes, for example, a software application programming interface (API) for supplying one or more coefficient values for a constant airflow algorithm. In such embodiments, received coefficient values are supplied to processor 114, processed, and stored in memory 116 along with a constant airflow algorithm for subsequent execution by processor 114 during operation of electric motor 106.

In certain embodiments, memory 116 is configured to store two or more constant airflow algorithms. Alternatively, memory 116 may be configured to store a single constant airflow algorithm, and one or more sets of constants to be utilized by the algorithm. In certain embodiments, electric motor 106 and motor controller 108 are configured to receive through communication interface 122 and utilize those coefficients with the constant airflow algorithm.

Figure 2:
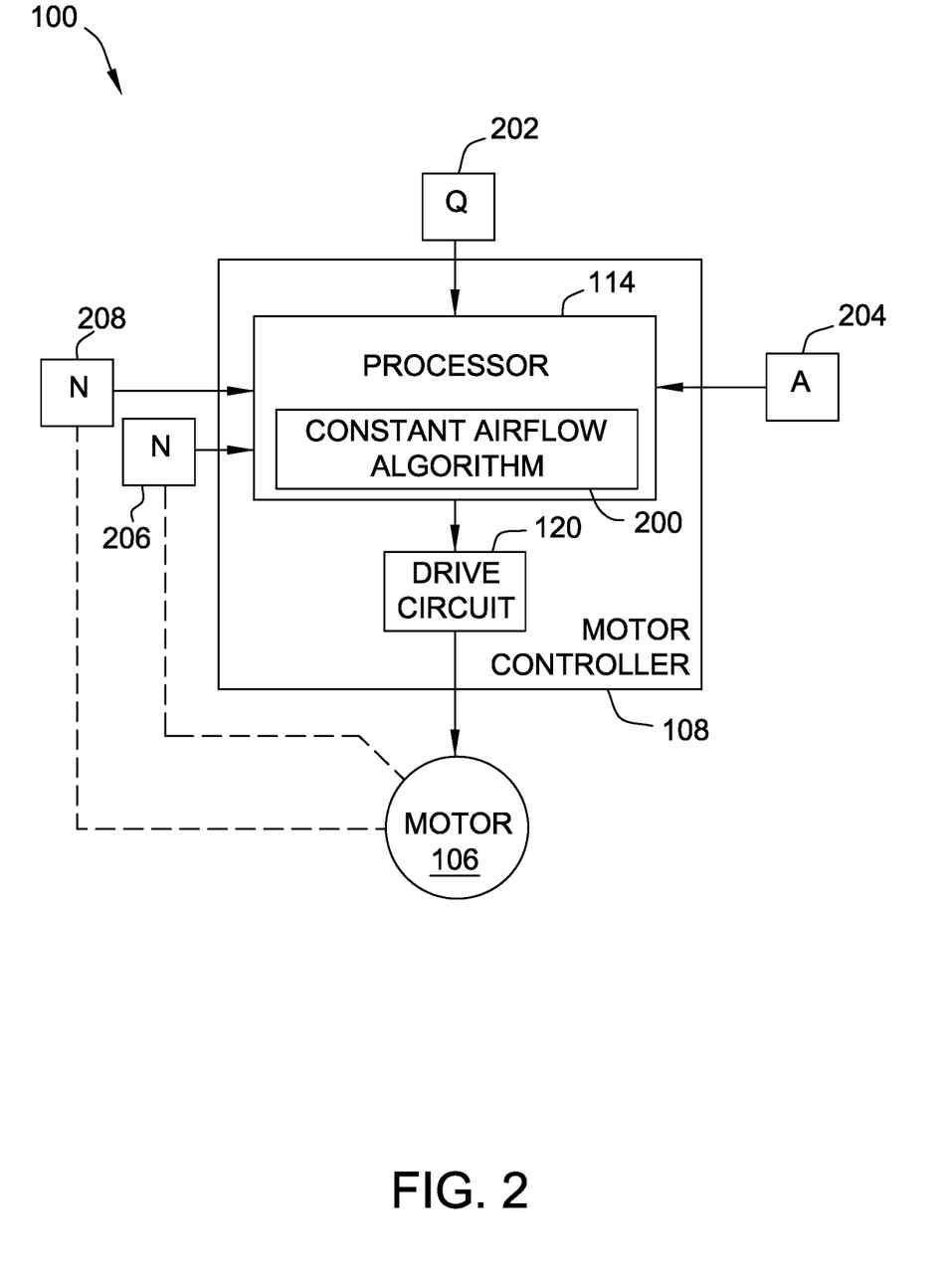
FIG. 2 is a logical block diagram of the constant airflow system shown in FIG. 1.

FIG. 2 is a logical block diagram of constant airflow system 100, including electric motor 106 and motor controller 108 (shown in FIG. 1). Processor 114 transmits control signals to drive circuit 120 to control the current and frequency of the electric power supplied to electric motor 106. Processor 114 executes, for example, a constant airflow algorithm 200, such as that described above in EQ. 1, EQ. 2, and EQ. 3 to compute one of a torque set point and a speed set point for controlling drive circuit 120 and electric motor 106. Execution of the algorithm is typically carried out periodically, e.g., at 10 Hertz, to update the torque set point or the speed set point. During operation, processor 114 receives an airflow rate demand value, Q, 202 that is used in constant airflow algorithm 200. Processor 114, in certain embodiments, may receive airflow rate demand value, Q, 202, directly from a system controller, such as system controller 110 (shown in FIG. 1). Alternatively, system controller 110 may supply airflow rate demand value, Q, 202 using discrete inputs representing an index into a table of airflow rate demand values stored in a memory from which processor 114 receives airflow rate demand value, Q, 202. Alternatively, system controller 110 may supply a pulse width modulated (PWM) signal that proportionately varies between two airflow rate demand values. In yet another alternative embodiment, system controller 110 may supply a digital command including airflow rate demand value, Q, 202.

Processor 114 also receives coefficient values, A, 204 that are used in constant airflow algorithm 200. Coefficient values, A, 204 may be received, for example, from system controller 110, from a memory, such as memory 116 (shown in FIG. 1), or from another external device. In certain embodiments, processor 114 receives coefficient values, A, 204 when constant airflow system 100 is, for example, manufactured, installed, or powered on, and processor 114 operates with those same values from that point on unless it is reset, reprogrammed, or recalibrated by a technician or other user. In other embodiments, processor 114 may receive a periodic update of coefficient values, A, 204 from a remote device and constant airflow algorithm 200 utilizes the latest values for a given iteration.

In certain embodiments, constant airflow algorithm 200 is selected from among multiple algorithms stored in memory 116. Memory 116 may include, for example, read-only memory such as an EEPROM. Constant airflow algorithm 200 is retrieved from memory 116 based on a user selection or a selection by system controller 110. In turn, for example, system controller 110 then transmits corresponding coefficient values, A, 204, a corresponding memory address for the space in memory 116 containing the appropriate coefficient values, A, 204, or an identifier, or "pointer," to such a memory address to processor 114. Processor 114 then gains access to the corresponding space in memory 116 and reads coefficient values, A, 204.

Processor 114 receives at least one of a measured speed, N, 206 and a measured torque 208 of electric motor 106. That is used in constant airflow algorithm 200. Measured speed, N, 206, for example, may be derived from a current signal supplied to the stator windings of electric motor 106. For example, such a current signal may be measured by a current sensor and measured speed, N, 206 is derived from that measurement. Alternatively, processor 114 may receive a frequency measurement from a frequency sensor on electric motor 106, the output of which may be converted to measured speed, N, 206. Alternatively, motor speed may be measured by any other suitable method, such as by further analyzing the current signal supplied to the stator windings of electric motor 106. Measured torque, T, 208, for example, may be derived from the current signal supplied to the stator windings of electric motor 106. For example, such a current signal may be measured by a current sensor and measured torque, T, 208 is derived from that measurement, e.g., by inference that torque output is equal to the commanded torque by virtue of a closed loop control system. Alternatively, processor 114 may receive a torque measurement from a torque sensor on electric motor 106 or, alternatively, by any other suitable method.

During operation, processor 114 executes constant airflow algorithm 200 using the several inputs described above, including airflow rate demand value, Q, 202, and at least one of measured speed, N, 206 and measured torque, T, 208. Upon execution of constant airflow algorithm 200, processor 114 computes one of a torque set point and a speed set point that is used to control drive circuit 120. Drive circuit 120 then supplies the desired current and frequency of AC electric power to electric motor 106 to turn blower 104 (shown in FIG. 1).

Figure 3:
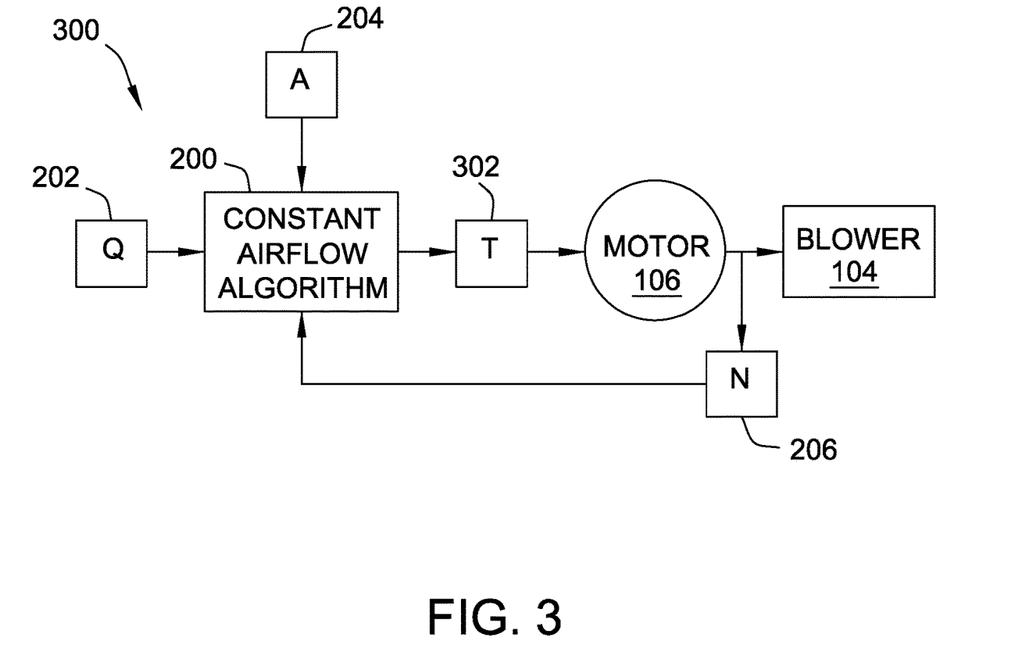
FIG. 3 is a schematic diagram of an exemplary constant airflow control loop for a torque-controlled electric motor.

FIG. 3 is a schematic diagram of one embodiment of constant airflow control loop 300 for use in controlling a torque-controlled electric motor, such as electric motor 106 of constant airflow system 100 (shown in FIG. 1 and FIG. 2). Control loop 300 may be embodied, for example, in motor controller 108 or processor 114, and illustrates control of electric motor 106 by execution of constant airflow algorithm 200 to compute a torque set point 302. Constant airflow algorithm 200 receives airflow rate demand, Q, 202 and measured speed, N, 206, and computes torque set point 302 based on, for example, the formulas shown in EQ. 1, EQ. 2, and EQ. 3.

Figure 4:
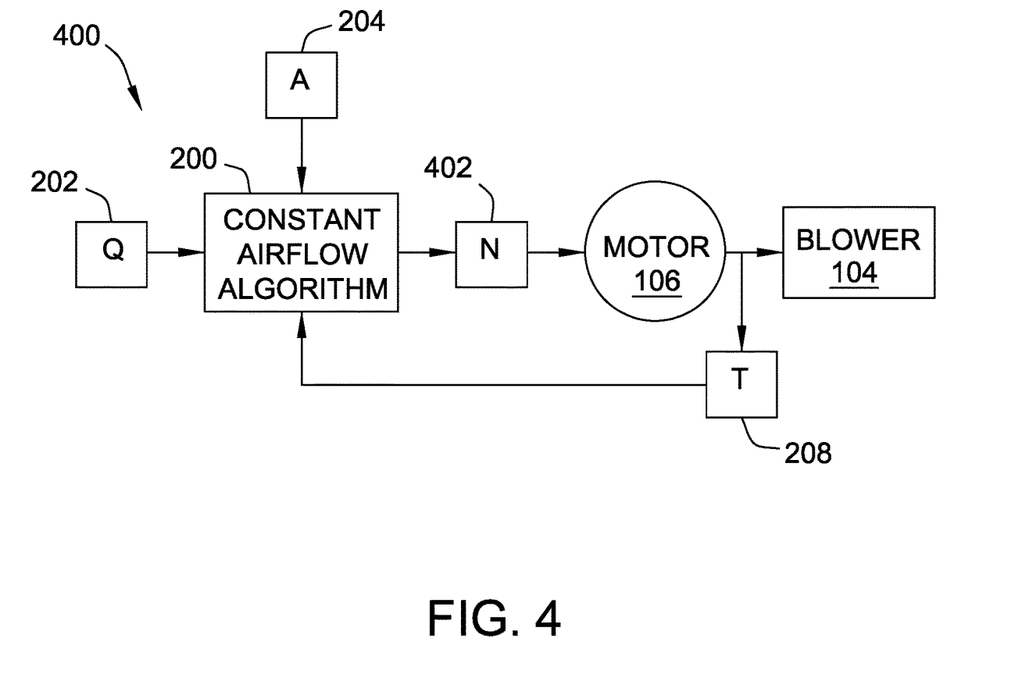
FIG. 4 is a schematic diagram of an exemplary constant airflow control loop for a speed-controlled electric motor.

FIG. 4 is a schematic diagram of one embodiment of a constant airflow control loop 400 for use in controlling a speed-controlled electric motor, such as electric motor 106 of constant airflow system 100 (shown in FIG. 1 and FIG. 2). Control loop 400 may be embodied, for example, in motor controller 108 or processor 114, and illustrates control of electric motor 106 by execution of constant airflow algorithm 200 to compute a speed set point 402. Constant airflow algorithm 200 receives airflow rate demand, Q, 202 and measured torque, T, 208, and computes speed set point, N, 402 based on, for example, the formulas shown in EQ. 1, EQ. 2, and EQ. 3.

Figure 5:
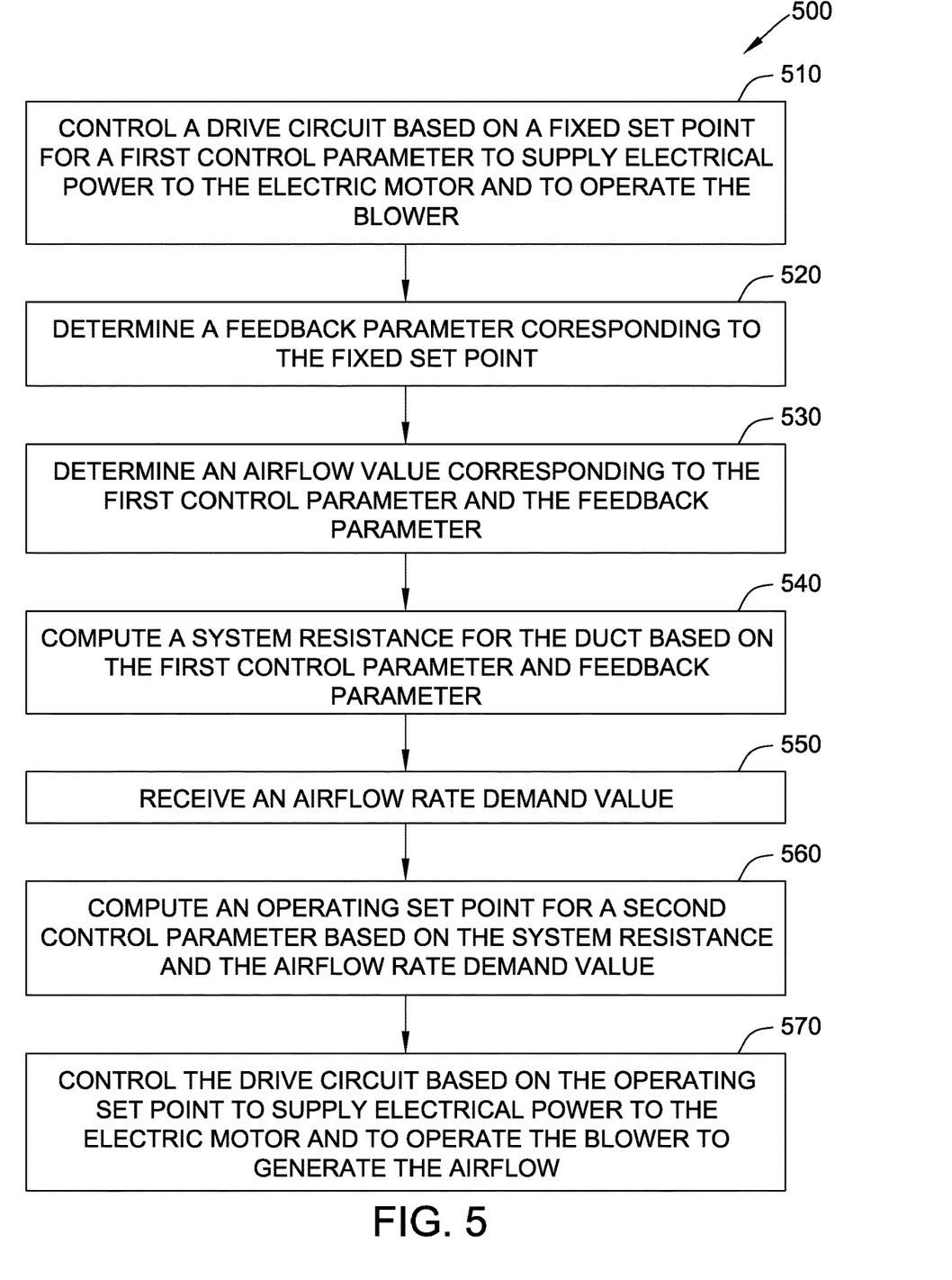
FIG. 5 is a flow diagram of an exemplary method of operating an electric motor configured to drive a blower to generate an airflow into a duct.

FIG. 5 is a flow diagram of an embodiment of a method 500 of operating an electric motor configured to drive a backward-curved blower, such as electric motor 106 and blower 104 of constant airflow system 100 (shown in FIG. 1). Blower 104 then generates an airflow into a space, such as duct 102. Referring to FIG. 1 and FIG. 5, method 500 may be embodied in a motor controller, such as motor controller 108 (shown in FIG. 1 and FIG. 2).

Motor controller 108 controls 510 drive circuit 120 based on a fixed set point for a first control parameter to supply electrical power to electric motor 106 and to operate blower 104. The first control parameter may be torque (T) output from electric motor 106. Alternatively, the first control parameter may be speed (N). Motor controller 108 determines 520 a feedback parameter corresponding to the fixed set point for the first control parameter. The feedback parameter may, in certain embodiments, be speed (N). In alternative embodiments, the feedback parameter may be torque (T). The first control parameter and the feedback parameter, in combination, include a speed (N) and a torque (T). For example, in one embodiment, the first control parameter is torque (T) and the feedback parameter is speed (N). In an alternative embodiment, the first parameter is speed (N) and the feedback parameter is torque (T).

Motor controller 108 determines 530 an airflow value corresponding to the torque (T) and speed (N). In certain embodiments, motor controller 108 may utilize an airflow algorithm, such as that shown in EQ. 1, for example, to compute the airflow value. The resulting torque-speed-airflow data point may then be used to compute 540 a system resistance (R) for duct 102. For example, in certain embodiments, the system resistance (R) is computed based on the airflow value and the speed. Further, in certain embodiments, a static pressure (P) is first computed based on the airflow value and torque or speed using a static pressure correlation, such as that shown in EQ. 3, and the system resistance (R) is then computed based on the airflow value and the static pressure value (P).

During or before operation, motor controller 108 receives 550 an airflow rate demand value (Q). This value may be received, for example, from remote system controller 110. The airflow rate demand value may be transmitted as, for example, a digital formatted value or, alternatively, a continuous pulse-width modulated signal representing the desired airflow rate demand (Q). An operating set point for a second control parameter is computed 560 based on the system resistance (R) and the airflow rate demand value (Q). The second control parameter, like the first control parameter, may be torque (T) or speed (N). The first and second control parameters are not necessarily the same. For example, the first control parameter, which is used to compute the initial system resistance (R), may be torque (T), and the second control parameter may be speed (N). Alternatively, in certain embodiments, the first and second control parameters may both be torque (T) or may both be speed (N). The operating set point for the second control parameter is then used by motor controller 108 to control 570 drive circuit 120 to supply electrical power to electric motor 106 and to operate blower 104 to generate the airflow.

In certain embodiments, in computing the operating set point for the second control parameter, motor control 108 is configured to translate the airflow rate demand value (Q) to a static pressure value (P) using, for example, the relationship shown in EQ. 2. The static pressure value (P) and airflow rate demand value (Q) are then used by motor control 108 to compute, using EQ. 3 for example, a necessary speed (N) at which electric motor 106 should be operated to produce the airflow. In alternative embodiments, motor control 108 may utilize a formula, similar to and derivable from EQ. 3, to compute a necessary torque (T) at which electric motor 106 should be operated to produce the airflow.

Over time, in certain embodiments, the system resistance (R) may shift, e.g., the system resistance may increase due to dust buildup on an air filter. Alternatively, the system resistance (R) may be deliberately changed by adjusting one or more dampers on the constant airflow system. Under such circumstances, motor controller 108 is configured to detect, for example, a change in torque (T) resulting from the shift in system resistance. In response to the change in torque (T), motor controller 108 is configured to re-compute, using EQS. 1-3, for example, the system resistance (R) based on the resulting updated torque-speed-airflow data point. Motor controller 108 is further configured to then compute a new set point for the second control parameter at which electric motor 106 should be operated. Motor controller 108 iterates these computations until the new system resistance (R) converges on the "actual" system resistance (R) and, likewise, the operating point stabilizes at a new torque (T) and speed (N).

Figure 6:
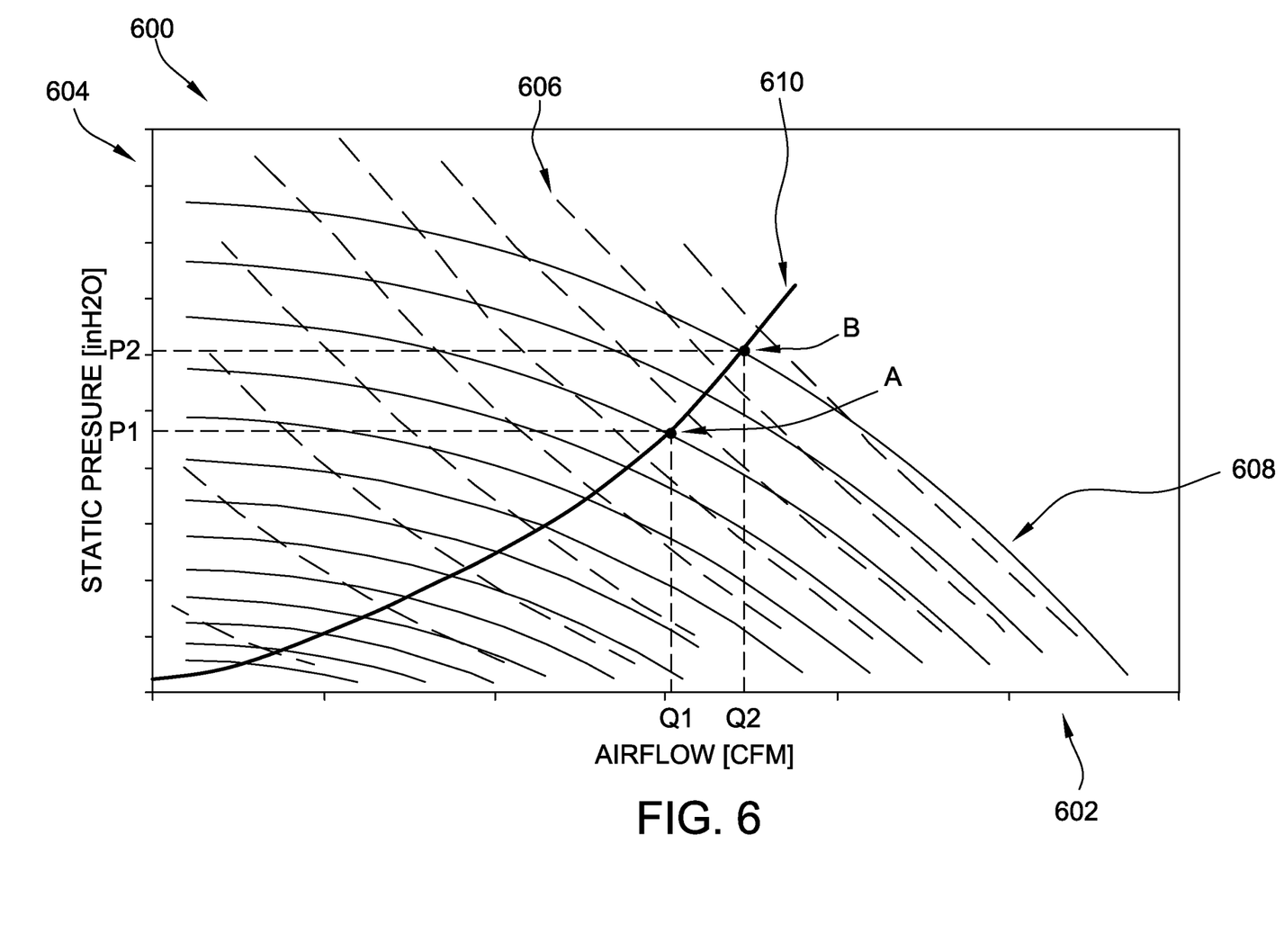
FIG. 6 is a plot of an example operating profile for a backward-curved blower.

FIG. 6 is a plot of an example operating profile 600. The plot illustrates demanded airflow (Q), expressed in CFM, versus static pressure (P), expressed in inches of water (inH2O). An airflow axis 602 extends horizontally and a static pressure axis 604 extends vertically. The plot includes various constant-torque lines 606 (shown as dashed lines), representing a series of airflow-pressure pairs, i.e., pairs of demanded airflow (Q) in CFM and static pressure (P) in inH2O, that produce an approximately constant torque output at the driveshaft of the motor. The plot includes various constant-speed lines 608 (shown as solid lines), representing a series of airflow-pressure pairs that produce an approximately constant speed output from the motor. The plot includes a system resistance line 610 representing a series of airflow-pressure operating points. For a given system resistance (R), system resistance line 610 illustrates a mathematical function for expressing static pressure (P) across the operating profile as a function of the demanded airflow (Q). For example, when the demanded airflow is at Q1, operating point A, on system resistance line 610, indicates a static pressure of P1 inH2O is demanded to produce the Q1 CFM airflow. Likewise, if the demanded airflow is increased to Q2 CFM, the operating point shifts along system resistance line 610 to an operating point B. At operating point B, system resistance line 610 indicates a static pressure of P2 inH2O is demanded to produce the Q2 CFM airflow. In certain embodiments of a constant airflow system, as the system resistance (R) shifts over time, system resistance line 610 shifts left (for increased resistance) or right (for decreased resistance).

The methods and systems described herein may be implemented using computer programming or engineering techniques including computer software, firmware, hardware or any combination or subset thereof, wherein the technical effect may include at least one of: (a) enabling use of a backward-curved blower in constant airflow systems while maintaining the benefits provided by the backward-curved blower over forward-curved or radial equivalent blowers; (b) improving accuracy of estimations of actual airflow for backward-curved blowers; (c) reducing blower size and power consumption for a given range of airflows in a constant airflow system by use of a backward-curved blower versus a forward-curved or radial equivalent; (d) reducing blower speed for a given range of airflows in a constant airflow system by use of a backward-curved blower versus a forward-curved or radial equivalent; and (e) improving thermal comfort and energy savings for operation of constant airflow systems.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor controller for an electric motor configured to drive a blower to generate an airflow, said motor controller comprising:
    a drive circuit configured to regulate electrical power supplied to a stator of the electric motor to turn a rotor of the electric motor and generate the airflow; and
    a processor coupled to said drive circuit and configured to:
        compute a system resistance for the blower based on a fixed set point for a first control parameter and a feedback parameter;
        receive an airflow rate demand value;
        compute a static pressure demand value based on the system resistance and the airflow rate demand value;
        compute an operating set point for a second control parameter based on the static pressure demand value and the airflow rate demand value; and
        control said drive circuit based on the operating set point to supply the electrical power to the electric motor and to operate the blower to generate the airflow.

2. The motor controller of claim 1, wherein said processor, in computing the system resistance, is further configured to:
    control said drive circuit based on the fixed set point for the first control parameter to supply electrical power to the electric motor and to operate the blower;

determine the feedback parameter corresponding to the fixed set point, the fixed set point and the feedback parameter, in combination, including two of a torque, a speed, or a power; and determine the airflow value corresponding to the fixed set point and the feedback parameter.

3. The motor controller of claim 2, wherein said processor, in computing the system resistance, is further configured to:

compute a static pressure generated by the blower based on the airflow and a speed; and compute the system resistance based on the static pressure and the airflow.

4. The motor controller of claim 3, wherein said processor is further configured to compute the static pressure using a static pressure correlation algorithm.

5. The motor controller of claim 1, wherein the first control parameter and the second control parameter are a same parameter.

6. The motor controller of claim 1, wherein the first control parameter is torque and the feedback parameter is speed.

7. The motor controller of claim 6, wherein the second control parameter is speed.

8. The motor controller of claim 6, wherein the second control parameter is torque.

9. The motor controller of claim 1, wherein the first control parameter is speed and the feedback parameter is an input power to the electric motor.

10. The motor controller of claim 1, wherein the first control parameter is a shaft power output from the electric motor or an input power to the electric motor, and the feedback parameter is a speed or a torque.

11. A method of operating an electric motor configured to drive a blower to generate an airflow, said method comprising:

controlling a drive circuit based on a fixed set point for a first control parameter to supply electrical power to the electric motor and to operate the blower;

determining a feedback parameter corresponding to the fixed set point;

determining an airflow value corresponding to the first control parameter and the feedback parameter;

computing a system resistance for the blower based on the first control parameter and the feedback parameter;

receiving an airflow rate demand value;

computing a static pressure demand value based on the system resistance and the airflow rate demand value;

computing an operating set point for a second control parameter based on the static pressure demand value and the airflow rate demand value; and controlling the drive circuit based on the operating set point to supply the electrical power to the electric motor and to operate the blower to generate the airflow.

12. The method of claim 11, wherein computing the system resistance includes:

computing a static pressure generated by the blower based on the airflow value and the feedback parameter; and computing the system resistance based on the static pressure and the airflow.

13. The method of claim 12, wherein computing the static pressure comprises computing the static pressure using a static pressure correlation algorithm.

14. The method of claim 11, wherein the first control parameter and the second control parameter are a same parameter.

15. The method of claim 11, wherein the first control parameter is torque and the feedback parameter is speed.

16. The method of claim 11, wherein the second control parameter is speed.

17. The method of claim 11, wherein the second control parameter is torque.

18. The method of claim 11, wherein the first control parameter is speed and the feedback parameter is torque.

19. The method of claim 11, wherein the first control parameter is a shaft power output from the electric motor or an input power to the electric motor, and the feedback parameter is a speed or a torque.

20. A constant airflow system, comprising:

a blower;

an electric motor coupled to and configured to drive said blower to generate an airflow into a duct, said electric motor comprising a stator and a rotor coupled to said blower;

a motor controller comprising a drive circuit configured to regulate electrical power supplied to said stator to turn said rotor and said blower to generate the airflow, and a processor configured to:

compute a system resistance for the duct;

receive an airflow rate demand value;

compute a static pressure demand value based on the system resistance and the airflow rate demand value;

compute an operating set point for a control parameter based on the static pressure demand value and the airflow rate demand value; and control said drive circuit based on the operating set point to supply the electrical power to said electric motor and to operate said blower to generate the airflow.

21. The constant airflow system of claim 20, wherein the motor controller is further configured to:

control said drive circuit based on a fixed set point for a first control parameter to supply electrical power to said electric motor and to operate said blower;

determine a feedback parameter corresponding to the fixed set point, the fixed set point and the feedback parameter, in combination, including two of a torque, a speed, an input power to said electric motor, or a shaft power output from said electric motor;

determine an airflow value corresponding to the fixed set point and the feedback parameter; and compute the system resistance based on the airflow value and the fixed set point or the feedback parameter.

* * * * *